US010120594B1

(12) United States Patent
Hardt et al.

(10) Patent No.: US 10,120,594 B1
(45) Date of Patent: Nov. 6, 2018

(54) REMOTE ACCESS LATENCY IN A RELIABLE DISTRIBUTED COMPUTING SYSTEM

(71) Applicant: Scale Computing Inc., Los Altos, CA (US)

(72) Inventors: Nate Hardt, San Carlos, CA (US); Scott Loughmiller, San Francisco, CA (US); Philip White, San Carlos, CA (US)

(73) Assignee: Scale Computing Inc, Indianapolis, IN (US)

( * ) Notice: Subject to any disclaimer, the term of this patent is extended or adjusted under 35 U.S.C. 154(b) by 695 days.

(21) Appl. No.: 14/554,034

(22) Filed: Nov. 25, 2014

(51) Int. Cl.
*G06F 15/16* (2006.01)
*G06F 3/06* (2006.01)

(52) U.S. Cl.
CPC .......... *G06F 3/0619* (2013.01); *G06F 3/0611* (2013.01); *G06F 3/0643* (2013.01); *G06F 3/0661* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| 2011/0161301 | A1* | 6/2011 | Pratt | G06F 3/0619 707/661 |
| 2012/0017059 | A1* | 1/2012 | Gold | G06F 11/1453 711/162 |
| 2012/0324183 | A1* | 12/2012 | Chiruvolu | G06F 11/2038 711/162 |

* cited by examiner

*Primary Examiner* — Esther B Henderson

(57) ABSTRACT

Techniques that can minimize latency during remote access between nodes in a reliable distributed computing system. A local computing device includes a protocol data unit that interacts with a substantially similar unit at a remote computing device. Each unit executes a finite state machine that is designed to minimize both the amount of wait time between messages and the number of round-trip message exchanges. The state machine resolves each request as quickly as possible to one of three states: SUCCESS, in which the transfer is successful and it is feasible to free the data transfer buffer, COMPLETE, in which the transfer is finished and a next transfer can be initiated, ABORT, in which either the sending or receiving unit declares the transfer to have failed (or aborted by a higher level element).

4 Claims, 2 Drawing Sheets

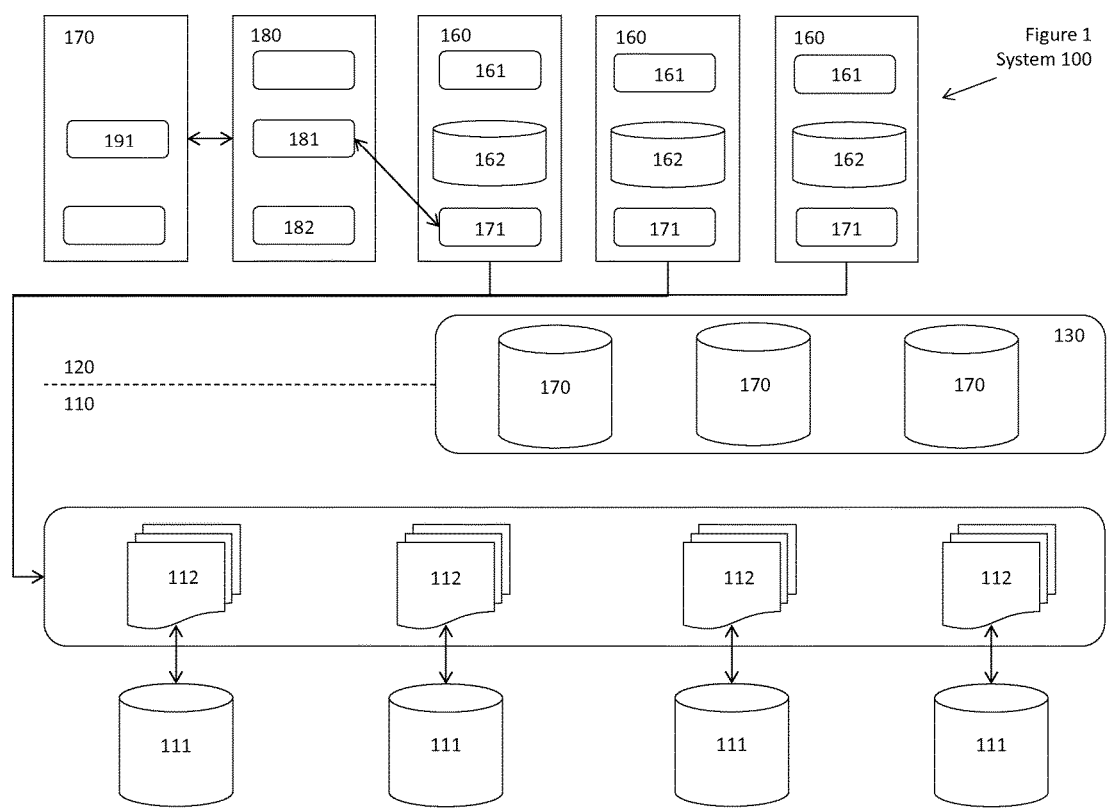

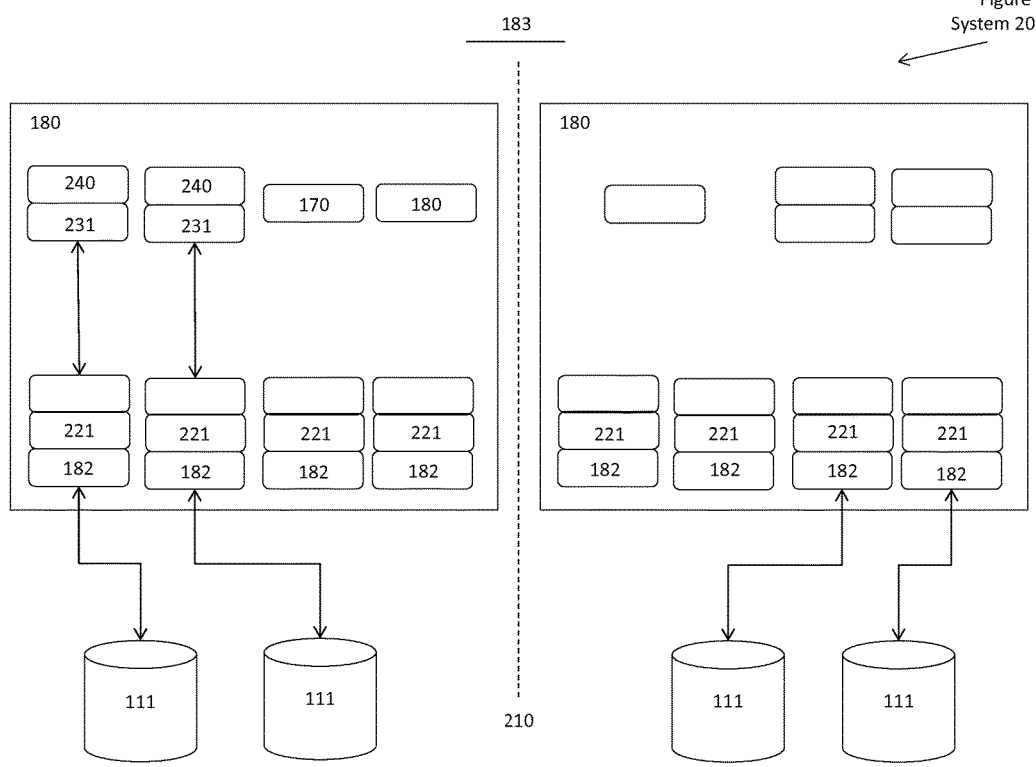

REMOTE ACCESS LATENCY IN A
RELIABLE DISTRIBUTED COMPUTING
SYSTEM

INCORPORATED DISCLOSURES

This Application describes technologies that can be used with inventions, and other technologies, described in one or more of the following Applications, each assigned to the same assignee:

Application 61/909,118, filed Nov. 26, 2013, in the name of Scott Loughmiller and Philip White, titled "Reduplication of de-duplicated files in a fault-tolerant distributed cluster".

Application 61/909,301, filed Nov. 26, 2013, in the name of Aaron Pagel and Nate Hardt, titled "Resource management in a virtual machine cluster".

Application 61/909,336, filed Nov. 26, 2013, in the name of Aaron Pagel and Nate Hardt, titled "Resource management in a virtual machine cluster".

Application 61/909,342, filed Nov. 26, 2013, in the name of Aaron Pagel and Nate Hardt, titled "Resource management in a virtual machine cluster".

Application 61/909,344, filed Nov. 26, 2013, in the name of Nate Hardt, Scott Loughmiller, and Philip White, titled "Unanticipated operational requirements in a reliable distributed computing system".

Application 61/909,365, filed Nov. 26, 2013, in the name of Nate Hardt, Scott Loughmiller, and Philip White, titled "Recovery after data loss in a reliable distributed computing system".

Application 61/909,352, filed Nov. 26, 2013, in the name of Nate Hardt, Scott Loughmiller, and Philip White, titled "Metadata caches in a reliable distributed computing system".

Application 61/909,356, filed Nov. 26, 2013, in the name of Nate Hardt, Scott Loughmiller, and Philip White, titled "Remote access latency in a reliable distributed computing system".

Application 62/080,773, filed Nov. 17, 2014, in the name of Clint McVey and Scott Loughmiller, titled "Zero memory buffer copying in a reliable distributed computing system".

Application 62/080,791, filed Nov. 17, 2014, in the name of Nate Hardt, Scott Loughmiller, and Philip White, titled "Virtual devices in a reliable distributed computing system".

Application No. (to be assigned), filed Nov. 24, 2014, in the name of Scott Loughmiller, Philip White, Aaron Pagel, Nate Hardt, and Clint McVey, titled "Reliable Independent Block Engine and State Machine".

Each and every one of these documents, as well as all documents cited therein, are hereby incorporated by reference as if fully recited herein.

This Application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

RELATED APPLICATIONS

This Application describes technologies that can be used with inventions, and other technologies, described in one or more of the following Applications, each assigned to the same assignee:

US Provisional Application 61/651,391, filed May 24, 2012, in the name of inventors Jason Collier, Scott Loughmiller, and Philip White, titled "Unified hypervisor and distributed fault-tolerant storage".

U.S. application Ser. No. 13/901,325, filed May 23, 2013, in the name of inventors Jason Collier, Scott Loughmiller, and Philip White, titled "Unified hypervisor and distributed fault-tolerant storage".

U.S. application Ser. No. 14/229,748, filed Mar. 28, 2014, in the name of inventors Philip White, and Hank Hsien, titled "Placement engine for a block device".

U.S. application Ser. No. 14/318,414, filed Jun. 27, 2014, in the name of inventors Philip White, titled "Shared reference counters among a plurality of virtual storage devices".

U.S. application Ser. No. 14/320,427, filed Jun. 30, 2014, in the name of inventors Philip White, titled "Efficient migration of virtual storage devices to a remote node using snapshots".

Each and every one of these documents, as well as all documents cited therein, are hereby incorporated by reference as if fully recited herein.

This Application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

BACKGROUND

Field of the Disclosure

This application generally relates to remote access, access latency, reliable computing systems, distributed computing systems, and other matters.

Background of the Disclosure

In distributed computing systems, it might sometimes be advantageous to maintain multiple copies of data at relatively distinct locations, with the effect that if data is lost at one location, it can be recovered from one or more alternative locations. In a storage system, this might make for contrasting needs: First, there is a need to keep multiple copies of data as far away as possible, to ensure that loss of an entire subsystem does not result in loss of all such copies. Second, there is a need to communicate between multiple copies of data as quickly as possible, to ensure that changes to one such copy are substantially immediately reflected in all such copies.

Each of these issues, as well as other possible considerations, might cause difficulty in aspects of operating computing systems, particularly in those computing systems in which virtual machines are implemented, or in computing systems making use of distributed resources.

BRIEF SUMMARY OF THE DISCLOSURE

This application provides techniques in which multiple copies of data can be maintained by distinct nodes, and can minimize latency during remote access between nodes in a reliable distributed computing system. In one embodiment, a local computing device includes a protocol data unit that interacts with a substantially similar unit at a remote computing device. Each unit can execute a finite state machine that is designed to minimize both the amount of wait time between messages and the number of round-trip message exchanges. The state machine resolves each request as quickly as possible to one of three states: SUCCESS, in which the transfer is successful and it is feasible to free the data transfer buffer, COMPLETE, in which the transfer is finished and a next transfer can be initiated, ABORT, in which either the sending or receiving unit declares the transfer to have failed (or aborted by a higher level element).

After reading this application, those skilled in the art would recognize that techniques shown in this application are applicable to more than just the specific embodiments shown herein. For a first example, the concept of a protocol data unit is intended to be broad, and can include multiple cooperating devices, a portion of a device operating as the protocol data unit and having other functions (such as another protocol data unit), or otherwise. For a second example, the concept of a state machine is intended to be broad, and can include a state machine having quantum, stochastic or non-von Neumann elements, or otherwise.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF THE FIGURES

FIG. 1 shows a conceptual drawing of a system.
FIG. 2 shows a conceptual drawing of a system.

DETAILED DESCRIPTION

Terms and Phrases

The following definitions are intended to be exemplary and illustrative, not necessarily limiting:

The phrase "real storage device," the term "RSD," and variants thereof, generally refer to any physical device with which the computer system can communicate.

The phrase "virtual storage device," the term "VSD," and variants thereof, generally refer to any virtual device whose capabilities are emulated by a host operating system or virtual machine.

FIGURES AND TEXT

System Overview
FIG. 1 shows a conceptual drawing of a system.
A system 100 includes elements described herein, other elements shown in the figure, and possibly other elements. In one embodiment, the system 100 includes two or more redundant nodes; however, the figure only shows one of those nodes. This one of multiple nodes is also in communication with those other nodes, with the effect of providing a reliable distributed computer system. As the multiple nodes frequently communicate the content of their memory and storage devices, the system 100 can be considered as if it were a distributed computer system with multiple real storage devices (RSD's) and a shared memory, each accessible to all processors of each individual redundant node. Accordingly, the figure should be considered to represent a distributed computer system with a shared memory and a set of shared RSD's.

Kernel Elements

The system 100 can include a kernel 110, that can include a set of kernel elements, or in addition to or in lieu thereof, a set of elements operating at a kernel level of authorization. The system 100 can also include a userspace 120, that can include a set of user elements, or in addition to or in lieu thereof, a set of elements operating at a user level of authorization (other than the kernel level of authorization).

The kernel no can be managed by a Linux kernel, and can include one or more real storage devices (RSD's) 111. While this application primarily describes RSD's 111 as storage devices, it is alternatively possible that they are other types of devices. For a first example, RSD's 111 could be network interface cards (NIC's), or any other suitable device, coupled to the kernel 110 using an iSCSI interface. For a second example, RSD's 111 could be another other device capable of operating as described herein.

As described herein, in one embodiment, RSD's 111 can include disk drives or other mass storage devices, such as SSD drives or otherwise, and can each be associated with a device queue 112. The device queue 112 can include instructions from a user in the userspace 120 (authorized by user access to the kernel, and sanitized by the kernel), and can include data to be written, locations of where to place data to be read, read/write instructions, responses to read/write instructions, and possibly error messages. As further described herein, the RSD's in and the device queues 112 can be managed by an I/O Manager (as further described herein) that provides user access to the kernel through a kernel access port 113.

The system 100 also includes at least some shared memory 110 (optionally, each individual node can include some non-shared memory). The shared memory 110 is shown in the figure as being on the border between kernel-accessible memory 120 and user-accessible memory 130, as the shared memory 110 can be accessed by either user resources or kernel resources. The distinction between user resources and kernel resources is further described herein.

Virtual Machines

The system 100 also can include one or more virtual machines (VM) 160, each including a guest operating system (guest OS) 161 and a host operating system (host OS), the latter including a set of drivers and indicated as Qemu 162. Each of the one or more guest OS's 161 can call on one or more of the drivers associated with its own copy of Qemu 162. Its Qemu 162 can include device drivers for virtual storage devices (VSD's) 170, each of which emulates a real-world storage device, although not necessarily a real-world storage device that is actually manufactured and sold.

While this application primarily describes VSD's 170 as storage devices, it is alternatively possible that they are other types of virtual devices. For a first example, VSD's 170 could be network interface cards (NIC's), or any other suitable device, coupled to its Qemu 162 using an iSCSI interface. For a second example, VSD's 170 could be another other device capable of operating as described herein.

Upon receiving an instruction to read/write, from/to, one or more VSD's 170, its Qemu 162 sends that instruction to a block driver element in the hypervisor that is managing its Qemu 162. That block driver element sends the instruction to a libscribe element 171, that performs the work of reading/writing data from/to the one or more RSD's 111 associated with those one or more VSD's 170. The libscribe element 171 is shown coupled to the RSD's 111 and their device queues 112, but in reality, the libscribe element 171 operates using a scribed daemon 180, and in particular, a libscribe server 181 within that scribed daemon 180.

"Scribed" Server

Accordingly, the libscribe element 171 sends the read/write instruction to the scribed daemon 180, an in particular, to the libscribe server 181 that can be included in the scribed daemon 180. (The scribed daemon 180 can operate using a scaled daemon 190, and in particular, a state machine 191 in the scaled daemon 190.) The libscribe server 181 sends the read/write instructions to an I/O Manager 182, which can be granted authorization to access selected portions of the kernel element 110, such as using a port 183.

The I/O Manager 182, using the port 183, can call upon the kernel element no to send the read/write instructions to the RSD's 111 and their device queues 112, where they can be executed and responded to. The I/O Manager 182, using the port 183, can obtain responses to the read/write instructions from the RSD's 111 and their device queues 112. The I/O Manager 182 can return those responses to the libscribe server 181, which can return them to the libscribe element 171, which can return them to the associated Qemu 162, which can return them to the associated goest OS 161.

This has the effect that the guest OS 161, which attempts to issue read/write instructions to a VSD 170, instead has those read/write instructions rewritten and redirected to one or more RSD's 111, upon which the data and metadata for that VSD 170 are stored.

System Overview II

FIG. 2 shows a conceptual drawing of a system.

A system 200 includes elements described herein, other elements shown in the figure, and possibly other elements. The system 200 includes two nodes 210, each corresponding generally to the type of system 100 shown in FIG. 1. The RSD's 111 in FIG. 2 correspond to the RSD's 111 in FIG. 1. The VSD's 170 in FIG. 2 correspond to the VSD's 170 in FIG. 1. The scribed daemons 180 in FIG. 2 correspond to the scribed daemons 180 in FIG. 1. The IOManagers 182 in FIG. 2 correspond to the IOManagers 182 in FIG. 1.

RSD Ports

Each of the two nodes 210 can include a number of RSD ports 220, such as those labeled RSD 0, 1, 2, and 3, at each node 210. An RSD port 220 shown in FIG. 2 corresponds generally to a libscribe server 181, or a portion thereof, as shown in FIG. 1.

When the RSD port 220 accesses a "local" RSD 111, that is, an RSD 111 that is physically coupled to the node 210, the RSD port 220 accesses an "RSD local" driver 221, which accesses the IOManager 180, which accesses the RSD 111. Requests or commands to the RSD 111 follow the pathway just described, while responses or replies from the RSD 111 follow the reverse of the pathway just described. This has the effect that the RSD 111 replies to the IOManager 180, which replies to the RSD local 221, which replies to the RSD port 220. This has the effect that the node 210 can access a local RSD 111 without much concern with respect to the type of device the RSD 111 actually is, as those concerns can be taken care of by the local RSD local 221 and the IOManager 180.

When the RSD port 220 accesses a "remote" RSD 111, that is, an RSD 111 that is operatively coupled to the node 210 using a communication link, such as the network 185, and not directly physically coupled to the node 210, the RSD port 220 accesses an "RSD proxy" 231, which accesses a local PDU Peer 240, which accesses the network 185, which accesses a PDU Peer 240 at the remote node, which accesses an "RSD remote" 232 at the remote node, which accesses an RSD port 220 at the remote node. Requests or commands from the local RSD port 220 to the remote RSD port 220 follow the pathway just described, while responses or reports from the remote RSD port 220 to the local RSD port 220 follow the reverse of the pathway just described. This has the effect that the remote RSD port 220 replies to the RSD remote 232, which replies to the remote PDU Peer 240, which replies (using the network 185) to the local PDU Peer 240, which replies to the RSD proxy 231, which replies to the local RSD port 220. This has the effect that the node 210 can access a remote RSD port 220 without much concern with respect to the type of device the remote node 210 actually is, as those concerns can be taken care of by the remote RSD port 220.

Moreover, this has the effect that the node 210 can access a remote RSD 111 using a remote RSD port 220, so long as the remote RSD port 220 can be coupled to the remote RSD 111. This could be accomplished using the scribed daemon 180, which can couple any RSD port 220 to any VSD 170, thereby to any other RSD 220, or alternatively, can couple any RSD port 220 directly to any other RSD port 220.

PDU Peers

In one embodiment, each PDU Peer 240 is coupled to its corresponding PDU Peer 240 using a communication like, such as the network 185, and using a PDU Peer-Peer protocol. In one embodiment, the PDU Peer-Peer protocol is driven at each end by control of each PDU Peer 240 by a finite state machine (FSM), with the effect that each PDU Peer 240 has predictable behavior, not necessarily stochastic such as the exponential back-off and retry favored by many network protocols. Each PDU Peer 240 has substantially the same finite state machine.

In one embodiment, the finite state machine is designed to minimize both the amount of wait time between messages, and the number of round-trip message exchanges. Each of these factors decreases the mean latency for response from a remote node 210, with the effect that a VSM 170 can be spread out across multiple nodes 210 (each with multiple units, each having multiple RSD's 111), without sufficiently substantial wait time that a user will notice the delay. This has the effect that a reliable distributed computing system can be made more distributed, and consequently, more reliable.

In one embodiment, the finite state machine receives each request from the "other side" and resolves that request as quickly as possible. For example, this could involve resolving each request as quickly as possible to one of three states: SUCCESS, COMPLETE, or ABORT. In a SUCCESS state, the data transfer has been successful; if the PDU Peer 240 was transmitting, it can free the transmit buffer; if the PDU Peer 240 was receiving, it can copy the data from the receiving buffer and know it is good data. In a COMPLETE state, the data transfer is finished and a next data transfer can be started. In an ABORT state, either the sending unit or the receiving unit has declared the transfer to have failed (or to have been aborted by a higher level element).

ALTERNATIVE EMBODIMENTS

While some embodiments are generally described herein with respect to block transfer when virtual machines are prevented access to real devices, in the context of the invention, there is no particular requirement for any such limitation. For example, individual elements or method steps of the described embodiments could be replaced with substitutes that perform similar functions in other contexts.

Examples of such contexts can include any system in which information is transferred between processes (or threads) with differing security authorization.

While some embodiments are generally described herein with respect to transfer of unitary blocks of data, in the context of the invention, there is no particular requirement for any such limitation. For example, individual elements or method steps of the described embodiments could be replaced with substitutes that perform similar functions in other contexts. Examples of such contexts can include any system in which large data transfers are contemplated, such as a system that transfers a collection of multiple data packets (so long as locations of those data packets can be identified).

Elements of the system are described herein with respect to one or more possible embodiments, and are not intended to be limiting in any way. In the context of the invention, there is the particular requirement for any such limitations as described with respect to any elements of the system. For example, individual elements of the described apparatuses could be replaced with substitutes that perform similar functions. Moreover, as described herein, many individual elements of the described apparatuses are optional, and are not required for operation.

Although control elements of the one or more described apparatuses are described herein as being executed as if on a single computing device, in the context of the invention, there is no particular requirement for any such limitation. For example, the control elements of the one or more described apparatuses can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure and the inventive subject matter.

The invention claimed is:

1. In a reliable distributed computing system having a plurality of nodes, each said node including one or more computing devices, each said computing device including a processor and a plurality of storage devices, a method of substantially minimizing remote access latency with respect to virtual storage devices in said reliable distributed computing system, said method including steps of:

maintaining a plurality of copies of one or more file system units, including at least a first copy at a first computing device and a least a second copy at a second computing device, the first copy and the second copy being substantially identical and each being substitutable for each other, the first copy being maintained at a first one of said plurality of nodes and the second copy being maintained at a second one of said plurality of nodes;

maintaining one or more virtual machines at one or more said computing devices, each said virtual machine including a guest operating system, each said guest operating system operating under control of a host operating system, each said virtual machine having access to one or more virtual storage devices, said virtual storage devices being emulated using real storage devices by one or more of said host operating systems;

receiving a request from a guest operating system to perform read and write operations on a particular one said file system unit associated with a particular one said virtual storage device;

determining an associated real storage device being used to emulate said particular one virtual storage device;

determining whether said associated real storage device is local to the requesting computing device or remote from the requesting computing device; and when said particular said file system unit is local to the requesting computing device, providing corresponding read and write instructions to a real storage device controller associated with said real storage device with respect to said particular one file system unit;

when said particular said file system unit is remote from the requesting computing device, providing corresponding read and write instructions to a proxy for a real storage device controller associated with said real storage device with respect to said particular one file system unit, sending a request including corresponding read and write instructions from said proxy to a local protocol unit to communicate with a corresponding real storage device controller at the remote file system unit, and forwarding a response from the real storage device controller at the remote file system unit to said proxy with respect to said corresponding read and write instructions;

wherein said remote protocol unit is disposed to receive and respond to said read and write instructions, including reading and writing both said first copy of said particular one file system unit at a remote computing device directly coupled to said associated real storage device, and said system is disposed to receive and respond to corresponding read and write instructions with respect to said second substantially identical copy thereof; and wherein a duration of communication between said proxy for a real storage device controller and said corresponding remote real storage device controller is limited to not more than a preselected time for completion of said corresponding read instruction or corresponding write instruction.

2. A method as in claim 1, wherein one or more said file system units include at least one of:
a mountable disk or disk partition;
a file system node or inode;
a file system block or regularized block of data.

3. Apparatus including:
a reliable distributed computing system having a plurality of nodes, each said node including one or more computing devices, each said computing device including a processor and a plurality of storage devices,
instructions directing each of said computing devices to perform a method of substantially minimizing remote access latency with respect to virtual storage devices in said reliable distributed computing system,
said instructions directing each of said computing devices to:
maintain a plurality of copies of one or more file system units, including at least a first copy at a first computing device and a least a second copy at a second computing device, the first copy and the second copy being substantially identical and each being substitutable for each other, the first copy being maintained at a first one of said plurality of nodes and the second copy being maintained at a second one of said plurality of nodes;
maintain one or more virtual machines at one or more said computing devices, each said virtual machine including a guest operating system, each said guest operating system operating under control of a host operating system, each said virtual machine having access to one or more virtual storage devices, said virtual storage devices being emulated using real storage devices by one or more of said host operating systems;
receive a request from a guest operating system to perform read and write operations on a particular one said file system unit associated with a particular one said virtual storage device;
determine an associated real storage device being used to emulate said particular one virtual storage device;
determine whether said associated real storage device is local to the requesting computing device or remote from the requesting computing device; and
when said particular said file system unit is local to the requesting computing device, providing corresponding read and write instructions to a real storage device controller associated with said real storage device with respect to said particular one file system unit;
when said particular said file system unit is remote from the requesting computing device, providing corresponding read and write instructions to a proxy for a real storage device controller associated with said real storage device with respect to said particular one file system unit, sending a request including corresponding read and write instructions from said proxy to a local protocol unit to communicate with a corresponding real storage device controller at the remote file system protocol unit, and forwarding a response from the real storage device controller at the remote file system unit to said proxy with respect to said corresponding read and write instructions;
wherein said remote protocol unit is disposed to receive and respond to said read and write instructions, including reading and writing both said first copy of said particular one file system unit at a remote computing device directly coupled to said associated real storage device, and said system is disposed to receive and respond to corresponding read and write instructions with respect to said second substantially identical copy thereof; and
wherein a duration of communication between said proxy for a real storage device controller and said corresponding remote real storage device controller is limited to not more than a preselected time for completion of said corresponding read instruction or corresponding write instruction.

4. Apparatus as in claim 3, wherein one or more said file system units include at least one of:
a mountable disk or disk partition;
a file system node or inode;
a file system block or regularized block of data.

* * * * *